Dec. 16, 1958 — T. F. REED — 2,864,688
TWO-STEP METHOD OF REMOVING OXYGEN FROM IRON OXIDE
Filed Jan. 28, 1958 — 3 Sheets—Sheet 1

INVENTOR
THOMAS F. REED,
BY: Donald G. Dalton
his Attorney.

EQUILIBRIUM CONSTANTS FOR IRON OXIDE REDUCTION
$K_1 = CO_2/CO \quad FeO + CO \rightarrow Fe + CO_2$
$K_2 = H_2O/H_2 \quad FeO + H_2 \rightarrow Fe + H_2O$
$K_3 = CO_2/CO \quad Fe_3O_4 + CO \rightarrow 3FeO + CO_2$
$K_4 = H_2O/H_2 \quad Fe_3O_4 + H_2 \rightarrow 3FeO + H_2O$
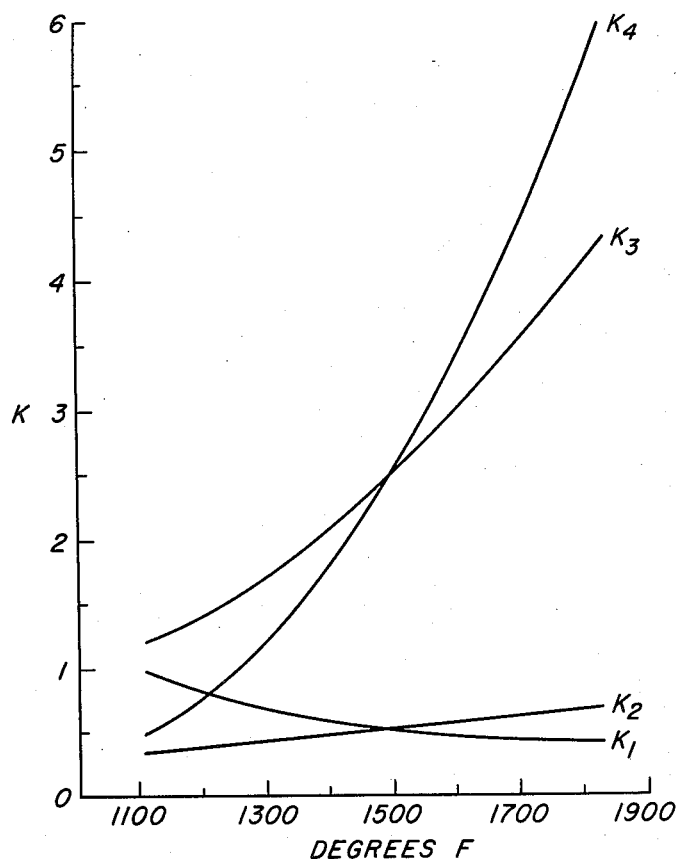

Dec. 16, 1958 T. F. REED 2,864,688
TWO-STEP METHOD OF REMOVING OXYGEN FROM IRON OXIDE
Filed Jan. 28, 1958 3 Sheets-Sheet 3
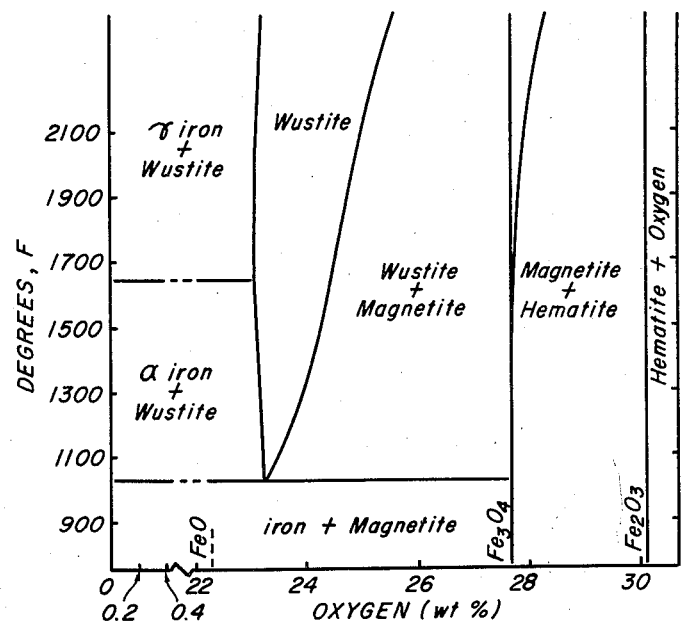
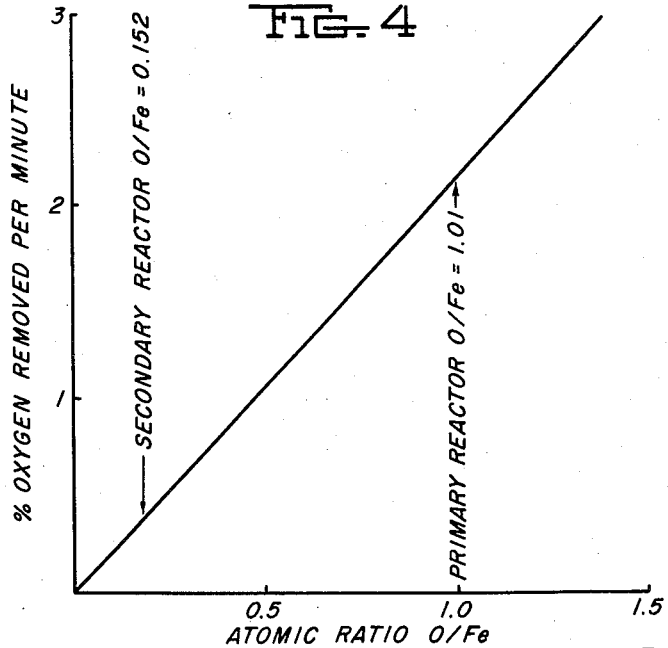
INVENTOR
THOMAS F. REED
By Donald G. Dalton
Attorney

2,864,688

TWO-STEP METHOD OF REMOVING OXYGEN FROM IRON OXIDE

Thomas F. Reed, Pittsburgh, Pa., assignor to United States Steel Corporation, a corporation of New Jersey Application January 28, 1958, Serial No. 711,757

1 Claim. (Cl. 75—26)

This invention relates to an improved method of removing oxygen from iron oxide in a system of fluidized beds.

The present application is a continuation-in-part of my earlier copending application Serial No. 568,777 filed March 1, 1956, which in turn was a continuation-in-part of my earlier application Serial No. 520,454, filed July 7, 1955, both now abandoned, and copending therewith.

Conventional direct reduction methods for removing oxygen from iron oxide involve contacting iron oxide at an elevated temperature with a reducing gas, such as hydrogen, carbon monoxide, mixtures thereof, or a hydrocarbon. Such methods can be applied to oxide of relatively coarse particle size in static beds or finer particle size in beds fluidized by ascending gas currents, but previous processes of both types have had disadvantages. In a static bed oxygen is removed progressively from the point where oxide particles enter the system to that where they discharge. There are no clearly defined steps and no way of controlling reactions nor intermediate compositions in advance of final products. Fines interfere with permeability and hence must be largely avoided. In previous fluidized beds iron oxide is treated in either one or a plurality of beds and either continuously or in batches, but in most instances there has been little control over intermediate products. The content of reducing constituents in the final off-gas has been uneconomically high, since this gas retains capacity to remove oxygen from higher oxides to reduce them to FeO.

Efforts have been made to employ hydrocarbon reducing gas to remove oxygen from iron oxide, but hydrocarbons are effective only at undesirably high temperatures of perhaps 1600° F. at which the reduced particles tend to stick and stop fluidization. In practice the necessary temperature cannot be attained by preheating hydrocarbons, since they decompose and deposit carbon, but only by their partial combustion in the oxygen removal chamber. Consequently the reducing gas is diluted with products of combustion which are detrimental to its capacity to remove oxygen, the result being an abnormally high gas consumption. It is also difficult to avoid excessive carbon deposition within the oxygen removal chamber, which deposition further causes abnormally high gas consumption. As a specific example of these two difficulties, in a process using methan as the reductant at least 58,000 cubic feet of methane are required to remove one ton of oxygen from iron ore, whereas in my process only 28,000 cubic feet of methane are required to produce the necessary hydrogen to remove one ton of oxygen from iron ore.

An object of the present invention is to provide an improved fluidized bed direct reduction method of removing oxygen from iron oxide in which the reducing gas is used more efficiently by decreasing the content of reducing constituents in the final off-gas.

A further object is to provide an improved direct reduction method in which oxygen is removed from iron oxide in two carefully controlled steps, first in a fluidized bed or series of beds wherein oxygen is removed from higher oxides of iron to form an intermediate product whose composition approaches FeO, and second in another fluidized bed or series of beds wherein oxygen is removed from the intermediate product to form a final product whose composition approaches metallic iron, off-gas from the second step being used to remove oxygen in the first.

A further object is to provide an improved two-step fluidized bed method of removing oxygen from iron oxide in which a maximum reaction rate is maintained in both steps through control of the bed compositions, and there is maximum gas utilization per pass to minimize the quantity of reducing constituents in the final off-gas.

In the drawings:

Figure 2 is a graph showing equilibrium constants for the reactions involved at various temperatures;

Figure 3 is an iron-oxygen diagram over the pertinent temperature range; and

Figure 4 is a typical reaction rate curve for the removal of oxygen from iron oxide with hydrogen or a mixture of hydrogen and carbon monoxide as reducing gas.

Figure 1:
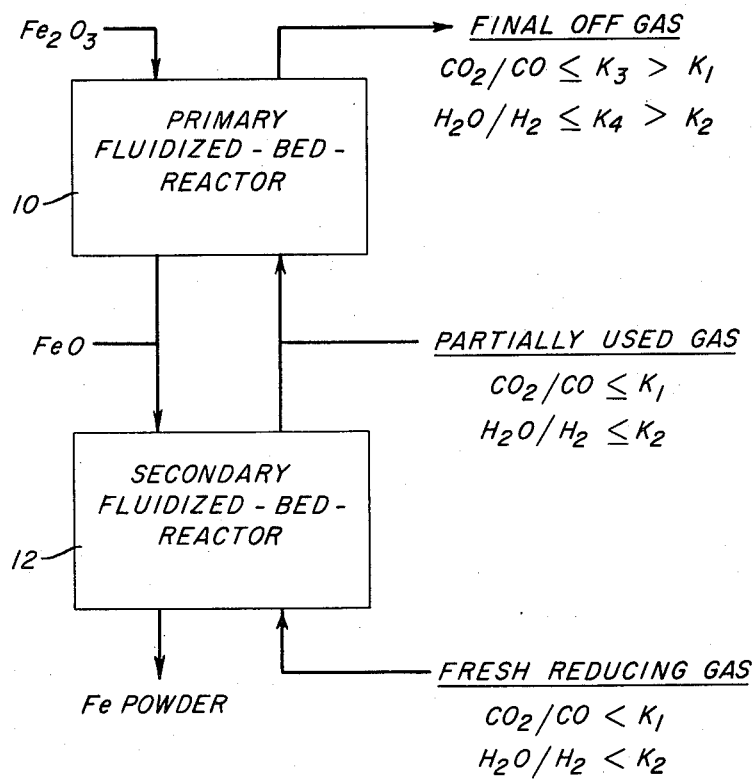
Figure 1 is a schematic representation of a two-step oxygen removal method in accordance with my invention.

Figure 1 shows schematically primary and secondary reactors 10 and 12, which can be of any conventional construction wherein ascending gas currents can maintain beds of finely divided solids in a fluidized state. The two reactors can be housed either in a common vessel appropriately partitioned or in separate vessels. Preheated finely divided iron oxide (e. g. hematite, magnetite or combinations thereof) feeds continuously to the primary reactor and thence flows to the secondary reactor, from which it discharges reduced to a product predominantly metallic iron. Preheated reducing gas consisting essentially of hydrogen, but which can contain up to about 25 percent by volume carbon monoxide, is introduced continuously to the secondary reactor, where it maintains the iron oxide as a fluidized bed and reacts therewith in a manner hereinafter explained. Off-gas from the secondary reactor is introduced continuously to the primary reactor where its functions are similar, although the reactions differ. Off-gas from the primary reactor can be utilized as desired, but preferably for economic reasons it is regenerated for re-use in the reactors. The reducing reactions are endothermic, and the necessary heat preferably is supplied by preheating both the iron oxide and the gas, whereby no heat need be applied directly to either reactor and the reducing gas is not diluted with products of combustion.

In practicing the present invention, I maintain process conditions in the two reactors which substantially confine the reducing reactions in the primary reactor to one or more of the following:

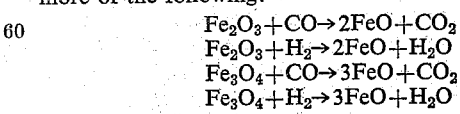

In the secondary reactor the reducing reactions are one or both of the following:

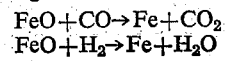

As these reactions proceed, the reducing constituents CO (if present) and $H_2$ are consumed, while the oxidation products $CO_2$ and $H_2O$ build up. The ratios $CO_2/CO$ and $H_2O/H_2$ can reach values sufficiently high that the reactions in effect cease, and the reactants are in equilibrium. In Figure 2 curves $K_1$ and $K_2$ represent the maximum ratios $CO_2/CO$ and $H_2O/H_2$ respectively which the reducing gas can contain and yet have capacity to remove oxygen from FeO and reduce it to metallic iron. Similarly curves $K_3$ and $K_4$ represent the maximum ratios for removing oxygen from higher oxides and reducing them to FeO. Therefore to maintain maximum efficiency of gas consumption per pass it is necessary to maintain $CO_2$ and $H_2O$ in the fresh incoming gas at a minimum so that the ratios $CO_2/CO$ and $H_2O/H_2$ are well below $K_1$ and $K_2$. It is also necessary to maintain process conditions in the secondary reactor such that the reactants are in contact long enough to approach equilibrium conditions, and in the off-gas the ratios are as close as possible to $K_1$ and $K_2$.

The practical temperature range for both reactors is about 1100° to 1400° F., the preferred temperature being about 1300° F. In theory the lower temperature limit in both reactors is governed by the lowest temperature at which magnetite ($Fe_3O_4$) and hematite ($Fe_2O_3$) reduce to wüstite (FeO) rather than immediately to metallic iron. As shown by the iron-oxygen diagram of Figure 3, this temperature is a little below 1100° F. The upper temperature limit is governed by the maximum that does not cause reduced particles to stick together and stop fluidization. The sticking temperature varies with process conditions, for example, type of oxide, particle size, gas composition. By virtue of using $H_2$ and CO as reductants, I can operate both reactors at temperatures well below that at which particles stick and still achieve satisfactory reduction. Reactor temperatures in the desired range can be attained by preheating the gas to about 1500° to 1700° F. and the ore to about 1500° to 1800° F.

When any material continuously enters a fluidized bed which is operating properly and continuously discharges therefrom, there is a negligible gradient of any kind throughout the bed. The material entering the bed disseminates so rapidly that for practical purposes the bed can be considered completely uniform. The incoming higher iron oxide to the primary reactor almost immediately attains the bed composition approaching FeO. Likewise the incoming intermediate product to the secondary reactor almost immediately attains the bed composition of the latter approaching metallic iron. Therefore I am able to select and maintain bed compositions (i. e. oxygen/iron ratios) at which the respective oxygen removal reactions proceed at maximum rates consistent with an appropriate degree of reduction in both the intermediate and final products. In Figure 4 I have indicated typical bed compositions for the primary and secondary reactors. Because hydrogen or a mixture of hydrogen containing no more than 25% CO is expensive and because the spent gas from the primary reactor still contains unused hydrogen, it is important to purify and recycle the spent gas. The quantity of recycle desirably is kept as low as possible by maximizing the conversion of hydrogen or hydrogen plus CO to water or water plus $CO_2$ per pass. I attain maximum gas utilization per pass by virtue of using off-gas from the secondary reactor as reducing gas in the primary, as already pointed out. Thus my method produces maximum efficiency, both as to the amount of oxygen removed per unit of cross-sectional reactor area and as to gas utilization.

In a specific example of my process, minus ⅜-inch iron ore, predominantly $Fe_2O_3$, was fed into the primary reactor and thence into the secondary reactor. Fresh reducing gas was introduced into the secondary reactor, and the off-gas therefrom into the primary reactor. Both reactors were maintained at 1300° F., the heat being supplied by preheating the ore and gas to 1700° F. and 1600° F., respectively. The gas compositions in percent were as follows:

|  | Fresh Reducing Gas | Actual Off-Gas From Secondary Reactor | Equilibrium Off-Gas From Secondary Reactor | Final Off-Gas |
|---|---|---|---|---|
| CO | 13.8 | 9.4 | 8.3 | 7.2 |
| $CO_2$ | 0 | 4.4 | 5.5 | 6.6 |
| $H_2$ | 74.7 | 58.9 | 53.1 | 48.7 |
| $H_2O$ | 1.5 | 17.3 | 23.1 | 26.0 |
| $N_2$ | 10.0 | 10.0 | 10.0 | 10.0 |
| $CO_2/CO$ | 0 | 0.468 | 0.673 | 0.918 |
| $H_2O/H_2$ | 0.02 | 0.294 | 0.435 | 0.535 |

In all, iron ore ($Fe_2O_3$) was charged at a rate such that .217 ton of oxygen per square foot per day were removed from the ore in the primary reactor and .364 ton of oxygen per square foot per day were removed from the ore in the secondary reactor. Note that the oxygen-to-iron atomic ratio in the primary stage was maintained at 1.01 or slightly richer in oxygen than FeO. The oxygen-to-iron atomic ratio in the secondary stage was maintained at .152 which represents the removal of about 90 percent of the oxygen from the original ore.

From the foregoing description and example, it is seen that my invention affords a simplified procedure for attaining maximum efficiency in removal of oxygen from iron oxide through use of a properly controlled two-step fluidized bed system. Contrasted with a single bed system, I achieve the first oxygen removal step with gas whose reducing power otherwise would be wasted. The same is true contrasted with a multibed system which produces any significant quantity of metallic iron before the final step. Contrasted with a system which employs hydrocarbon reducing gas, I require only a fraction of the quantity of gas, as well as operating at a more practical temperature and altogether avoiding problems of carbon deposition. Contrasted with static bed systems, I am able to control the bed composition precisely at each step for maximum reaction rates, as well as to utilize fine materials. In the present specification and claims the term "reactor" can include a plurality of beds, as well as a single bed, where the same reaction progresses through several beds. Likewise the term "step" can include a plurality of stages in which the same reaction occurs.

While I have shown and described certain preferred embodiments of my invention, it is apparent that other modifications may arise. Therefore, I do not wish to be limited to the disclosure set forth but only by the scope of the appended claim.

I claim:

A method of removing oxygen from iron oxide comprising continuously feeding finely divided preheated higher oxide solids to a primary reactor and thence to a secondary reactor, continuously introducing ascending currents of preheated reducing gas to the secondary reactor and of off-gas from the secondary reactor to the primary reactor, the reducing constituent of said gas consisting essentially of hydrogen and up to about 25 percent by volume carbon monoxide, the temperature of preheat of the solids being about 1600° to 1800° F. and of the gas about 1500° to 1700° F., the ascending gas currents maintaining the solids in each reactor as a fluidized bed whose characteristics are substantially uniform throughout, the average composition of the solids in the primary reactor approaching FeO and in the secondary reactor having a maximum O/Fe atomic ratio of about 0.152, which compositions are attained immediately by newly fed solids, controlling reactions in the secondary reactor to produce an off-gas in which the ratios $H_2O/H_2$ and $CO_2/CO$ approach equilibrium for removing oxygen from FeO, controlling reactions in the primary reactor to remove only sufficient oxygen from the higher oxides to form an intermediate product whose composition approaches FeO, and recovering a product predominantly metallic iron from the secondary reactor.

References Cited in the file of this patent

UNITED STATES PATENTS

| | | |
|---|---|---|
| 962,006 | Cornell | June 21, 1910 |
| 1,979,729 | Brown | Nov. 6, 1934 |
| 2,287,663 | Brossert | June 23, 1942 |
| 2,481,217 | Hemminger | Sept. 6, 1949 |
| 2,528,552 | Rayster | Nov. 7, 1950 |
| 2,711,368 | Lewis | June 21, 1955 |
| 2,752,234 | Shipley | June 26, 1956 |

FOREIGN PATENTS

| | | |
|---|---|---|
| 187,200 | Great Britain | Dec. 20, 1923 |